Patented Feb. 25, 1936

2,031,724

UNITED STATES PATENT OFFICE 2,031,724

FOOD PRODUCT AND ITS MANUFACTURE

William Ayer McKinney, Winnetka, and Heinz G. Lorenzen, Chicago, Ill., assignors to Kitchen Art Foods, Inc., Chicago, Ill., a corporation of Delaware No Drawing. Application February 13, 1933, Serial No. 656,592

6 Claims. (Cl. 99—11)

This invention relates to a yeast food product and its manufacture and among other objects aims to provide a stable product of this character which is palatable and yet which will contain an ample quantity of vitamin rich yeast.

The invention may be readily understood by reference to an illustrative product and the method of making it, embodying the invention and herein described.

Unpalatable as yeast alone is, it is nevertheless one of the richest known foods in vitamins B and G. Vitamin B is essential to growth in children and is related to maintenance of appetite and normal functioning of the nerves. Vitamin G is likewise essential to growth in children and is of great importance in nutrition and proper functioning of the digestive tract at all ages and in the prevention of nervous disorders. In this connection it is important to bear in mind that there is a wide difference between the amount of vitamin G, for example, necessary merely to prevent deficiency disorders and that necessary for buoyant health. In the latter case vitamins B and G are needed in larger amounts than the average diet affords. This makes a supplementary die of foods containing vitamins B and G desirable, and notwithstanding its unpleasant taste, yeast seems preferable for this purpose. Besides its unpleasant taste, moist yeast imposes difficulties because it must be continuously refrigerated to prevent fermentation and deterioration while in the hands of the dealer and consumer.

The inventive product contains yeast with full vitamin B and G strength in stable form, and notwithstanding the fact taht it may contain (and in the illustrative product does contain) about three times as much vitamin B and G potency as the ordinary cake of fresh compressed yeast, it is palatable and pleasant to eat. The unpleasant flavor of yeast is masked without making the product a candy—it is a health food and does not have the objectionable sweetness of candy.

In the present instance, the fermenting enzyme (zymase) in the yeast is rendered inactive by spray drying by the well known process. In the resulting yeast, a powder, the full vitamin B and G potency is preserved. Although in non-viable form it is nevertheless equally difficult to mask the yeast flavor, particularly since methods which might impair the vitamin strength of the yeast must be excluded. For example, heat, usually employed in compounding food products, cannot be used without devitalizing or destroying part or all of the vitamins. Moreover it is not desirable to employ water or water containing liquids because they would contribute to instability of the product and would give it undesirable physical characteristics.

The yeast flavor is masked by associating with it a substance or substances having what may be termed a complementary flavor which combines with that of the yeast, the resultant flavor being mild and pleasant. It is desirable, however, to avoid complete obliteration of the yeast flavor, but to leave it faintly evident, even though pleasantly blended, so that its presence will not be doubted. This method of masking the yeast flavor is radically different in principle from that involved in the use of strongly flavored or distinctive substances (chocolate and large amounts of sugar for example) which suppress the yeast flavor. Such products are objectionable since one soon tires of them and they cannot be eaten with the prolonged regularity necessary for the best results. On the other hand, by employing the present method of masking the yeast flavor (which involves the use of mild flavors which combine with the yeast flavor), the resultant product may be eaten regularly for long periods without weariness or revolt of the palate. In the present instance this method or principle is exemplified by the use of a limited quantity of sugar (in this case powdered cane sugar) and a small amount of oil of orange. Consistent with the operation of this principle the amount of oil of orange is so small as not to give the product a distinctive orange flavor. Its function along with that of the sugar, is to blend with or combine with the yeast flavor to produce a different, mild and pleasant flavor of which one does not tire. If desired, a trace of vanilla flavor (e. g. vanillin) may be added—but the amount is so small that its effect is entirely subordinate—it adds smoothness without contributing a distinctive or noticeable flavor.

Not only is no water added but the other ingredients employed contain no appreciable amounts of water as such. To add bulk, to facilitate manufacture of the product and to give the product other desirable physical characteristics, a substantial amount of powdered starch may advantageously be employed. This may be in the form of a gelatinized starch which is from 8% to 10% water soluble, i. e., a partially cooked starch wherein the starch is partly broken down to render it more readily digestible. Such starch is somewhat coarser than powdered raw corn starch, and facilitates mixing of the ingredients and tends to prevent sticking of the compound to the dies which compress it into cakes.

Other elements are combined with the foregoing to improve palatability of the product, to give it desirable physical properties which add to palatability, and to give the formed product adequate physical strength or coherence without however making it difficult to disintegrate when eaten. These elements are fat and small quantities of skim-milk powder and glycerin. The coaction of these elements with each other and with the sugar and other elements is not clearly understood. The glycerin apparently has a function in giving the product cohesive strength and adequate hardness by an appropriate coaction with the other elements. Increases in the amount of glycerin have the unexpected result of increasing hardness and strength. Although protected from the action of the atmosphere the cohesive strength of the product increases with age; but after a few days a stable condition of hardness is reached, which provides adequate cohesive strength without reducing substantially the ability of the product to disintegrate into pulverulent form when eaten.

The slightly hygroscopic property of the glycerin and possibly the presence of invert-sugar may have a bearing on the cohesive strength of the product. While the cane sugar when first mixed in the compound contains no invert-sugar (i. e. dextrose and laevulose), the latter is no doubt produced by the action of active invertase in the yeast,—the invertase not being affected by the temperatures employed in the drying process for rendering the zymase inactive. However the inversion is apparently quite limited, since even under exposure to air and heat (say 110° F.) for long periods of time the physical properties of the product do not change after the aforesaid stable condition of hardness has been reached. The fat probably serves in some measure in this connection by its coating action which substantially isolates the invertase and cane sugar.

The fat probably has an important function in controlling the action of the glycerin and other slightly hygroscopic materials which might tend to increase hardness by causing coalescence of the sugar crystals. Indeed the starch and milk powder very likely also act to prevent coalescence of the materials into a hard, coherent or brittle mass. The fat, starch and skim-milk powder as well as the sugar also function to facilitate mixing and formation of cakes of the product and improve its palatability by giving it a desirable smoothness and consistency. The amount of the skim-milk powder although small should be carefully regulated since too high a proportion will cause the product to stick to the teeth when eaten. The fat should preferably be one which melts under 110° F. such as hydrogenated cotton-seed oil.

Proportions of ingredients of one illustrative product are as follows:

| | |
|---|---|
| Powdered cane sugar | 16 oz. |
| Powdered corn starch | 20 oz. |
| Skim-milk powder | 4 oz. |
| Hydrogenated cotton-seed oil | 15 oz. |
| U. S. P. glycerin | 2½ oz. |
| Dried (unfermentable) yeast | 17 oz. |
| Flavoring, oil of orange | 40 minims |
| Small quantity of vanillin | 2 grains |

Combination of the various ingredients into a coherent mass for formation into cakes, is facilitated by first thoroughly sifting together in their proper proportions, the powdered ingredients (sugar, starch, milk powder, yeast and vanillin) into a mixing container. The proper proportion of fat is then deposited on the mixed dry ingredients and the glycerin and oil of orange are simultaneously poured over the fat. The entire mass is then thoroughly mixed, kneaded and flaked by screening. Preferably these operations are repeated a second time to improve the homogeneity of the product. While fixed or uniform room temperatures are not essential during compounding of the product, the fat can be most satisfactorily incorporated at temperatures from 55° to 65° F.

Thereupon weighed amounts, e. g. half-ounce portions, are pressed into cake form in a die. Such a quantity of material will produce a cake approximately one inch wide, two inches long and five-sixteenths of an inch thick, and containing about three times as much vitamin B and G as the ordinary moist yeast cake.

After the cakes are formed a progressive hardening takes place throughout a period of from six to twenty-four hours.

For handling and distribution the cakes are advantageously covered with a protective wrapper such as "Cellophane."

Obviously the invention is not limited to the details of the illustrative disclosure since these may be variously modified. Moreover it is not essential that all features of the invention be used conjointly since various features may be used to advantage in different combinations and subcombinations.

Having described our invention, we claim:

1. The method of making a palatable yeast food product without the use of heat which is characterized by mixing together dry ingredients including dry yeast, sugar and consolidating the same by a small quantity of glycerin which does not substantially affect the sugar so as to avoid excessive hardness in the material.

2. The method of making a palatable yeast food product without the use of heat which is characterized by mixing together dry ingredients including dry yeast and sugar, mixing the dry ingredients with an edible fat so as to coat the sugar with the fat, and consolidating the mixed ingredients by a binding substance, said fat serving to protect the sugar against substantial physical change.

3. As a product of manufacture, a palatable yeast food product comprising dry yeast in which the zymase is inactive, sugar and a minute quantity of flavoring substance such as oil of orange which combines with the yeast flavor to mask the latter without giving the product the distinctive flavor of the flavoring substance, a slightly hygroscopic consolidating medium which acts to bind the ingredients together, and an edible fat coating the sugar to limit the action of the consolidating medium on the sugar.

4. As a product of manufacture, a palatable yeast food product comprising dry yeast in which the zymase is inactive, sugar and a flavoring substance which combines with the yeast flavor to mask the latter without giving to the cake the distinctive flavor of the flavoring substance, and an edible fat which coats the sugar to limit inversion.

5. As a product of manufacture, a stable yeast food product containing dry yeast, dry sugar and a dry bulking material, said materials being in finely granular form and being mixed and formed into cakes, and a small quantity of glycerin for consolidating the mass and giving it cohesive strength, said glycerin being used in such small proportion as to leave the sugar substantially unaffected whereby the cake will readily disintegrate into the granular condition of said materials.

6. As a product of manufacture, a palatable yeast food product in cake form containing unfermentable yeast in dry form, dry sugar and a dry bulking material such as starch, and a binding substance for consolidating said materials in cake form, the granules of the sugar being substantially free from intercrystallization so that the cake will readily disintegrate.

WILLIAM AYER McKINNEY.
HEINZ G. LORENZEN.